United States Patent Office 3,330,846
Patented July 11, 1967

3,330,846
CHLOROCARBONYLCYCLOPENTADIENYL MANGANESE TRICARBONYL
John Kozikowski, Walled Lake, Mich., and Michael Cais, Haifa, Israel, assignors to Ethyl Corporation, New York, N.Y., a corporation of Virginia
No Drawing. Original application Dec. 28, 1960, Ser. No. 78,820, now Patent No. 3,288,827, dated Nov. 29, 1966. Divided and this application Aug. 17, 1965, Ser. No. 505,198
1 Claim. (Cl. 260—429)

This application is a division of application Ser. No. 78,820, filed Dec. 28, 1960, now U.S. Patent No. 3,288,827.

This invention relates to a variety of organometallic compounds and the processes employed in their production. More specifically, this invention relates to compounds and processes involving the use of an acylcyclopentadienyl manganese tricarbonyl compound.

An object of our invention is to provide new organometallic compounds and processes for their preparation. A further object is to provide acylcyclopentadienyl manganese tricarbonyl derivatives and processes for their preparation. Additional objects will become apparent from a reading of the specification and claim which follow.

The objects of this invention are accomplished by reacting a carboxycyclopentadienyl manganese tricarbonyl with a compound such as phosphorus pentachloride, phosphorus trichloride or thionyl chloride to form a halocarbonylcyclopentadienyl manganese tricarbonyl. This reaction is customarily carried out in the presence of a nonreactive solvent. Some heating of the reaction mixture is necessary to initiate the reaction. To further illustrate this species of our invention, there is presented the following example.

EXAMPLE I

A mixture of 5 grams (0.0202 mole) of carboxycyclopentadienylmanganese tricarbonyl, 5 ml. of thionyl chloride and 50 ml. of carbon tetrachloride was heated to reflux for 45 minutes in a nitrogen atmosphere. A dark green solution resulted. The solvent and excess thionyl chloride were removed by distillation under reduced pressure. The crude product, which was chloroacetylcyclopentadienyl manganese tricarbonyl, weighed 5.25 grams, 98.5 percent of theory, and had a M.P. of 57–60° C. One recrystallization from petroleum ether (B.P. 30–60° C.) raised the melting point to 58–60° C.

*Analysis.*—Calcd. for $C_9H_4MnO_4Cl$: C, 40.6; H, 1.50; Mn, 20.5; Cl, 13.3. Found: C, 40.9; H, 1.58; Mn, 20.6; Cl, 13.4 percent.

The reaction was then repeated using phosphorous pentachloride as the chlorinating agent. A mixture of finely ground $PCl_5$ (6.25 grams, 0.03 mole) and carboxycyclopentadienyl manganese tricarbonyl (7.44 grams, 0.03 mole) was warmed gently to start the reaction. After the initial vigorous reaction had subsided, heating on a steam bath was resumed for ½ hour. Then 100 ml. of benzene was added and the $POCl_3$ formed in the reaction was removed by codistillation under reduced pressure. Recrystallization from petroleum ether yielded 6.5 grams, 81.4 percent yield of chlorocarbonylcyclopentadienyl manganese tricarbonyl having a melting point of 58–60° C.

The halocarbonylcyclopentadienyl manganese tricarbonyl compound, formed in the manner of the preceding example, can then be reacted with a metal azide to form a compound having the following formula:

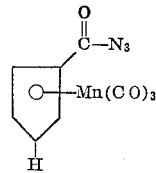

in which the cyclopentadienyl ring can be substituted with hydrocarbon groups containing from one to 8 carbon atoms. A preferred metal azide for use in this reaction is sodium azide. The reaction mixture is generally cooled during the reaction since metal azides can be explosive when heated. The reaction is carried out in the presence of a solvent which does not react with the halocarbonylcyclopentadienyl manganese tricarbonyl reactant. Preferred solvents are acetone and ketones in general. To further illustrate this embodiment of our invention, there is presented the following example.

EXAMPLE II

To a stirred solution of 7.0 grams (0.26 mole) of chlorocarbonylcyclopentadienyl manganese tricarbonyl in 65 ml. of acetone at 0° C. was added 2 grams (0.308 mole) of sodium azide in 6 ml. of water. Stirring was continued for 45 minutes at 0° C. and there was then added 100 ml. of water. After extracting the reaction mixture with ether, solvent was removed under reduced pressure. The yield of crude product was 7.0 grams, 97.8 percent, with a melting point of 39–41° C. The Beilstein test for halogen was negative. Recrystallization from petroleum ether (B.P. 37–43° C.) raised the melting point of the yellow crystals, azidocarbonylcyclopentadienyl manganese tricarbonyl, to 40–42° C. *Analysis.*— Calcd. for $C_9H_4MnO_4N_3$: Mn, 20.2. Found: Mn, 20.0. The compound has good solubility in most organic solvents.

Carboxycyclopentadienyl manganese tricarbonyls employed as the starting materials in this invention may be prepared by reacting a tertiary amine salt of a haloacylcyclopentadienyl manganese tricarbonyl, such as 1-[2-oxo - 2 - (tricarbonylmanganocyclopentadienyl)ethyl]-pyridinium halide, with two moles of a base. The preparation of carboxycyclopentadienyl manganese tricarbonyls, as well as the preparation of other related cyclopentadienyl manganese tricarbonyl compounds, is fully described in our copending patent application Ser. No. 78,820, filed Dec. 28, 1960, now U.S. Patent No. 3,288,827.

Among the important uses of our compounds is their use as fuel and oil additives. For example, they are useful antiknocks when added to gasoline. They may be used as primary antiknocks in which they are the major antiknock component in the fuel or as supplemental antiknocks. When used as supplemental antiknocks, they are present as the minor antiknock component in the fuel in addition to a primary antiknock such as a tetraalkyllead compound. Typical alkyllead compounds are tetraethyllead, tetrabutyllead, tetramethyllead and various mixed lead alkyls such as dimethyldiethyllead, diethyldibutyllead and the like. When used as either a supplemental or primary antiknock, our compounds may be present in the gasoline in combination with typical scavengers such as ethylene dichloride, ethylene dibromide, tricresylphosphate, trimethylphosphate and the like.

The compounds of our invention have further utility as additives to residual and distillate fuels generally, e.g., jet fuels, home heater fuels and diesel fuels, to reduce smoke and/or soot formation. Also, they may be employed as additives to lubricating oils in which case they act to improve the lubricity of the base oil. In addition, they may be employed as additives to solid fuels to control burning rate.

Our compounds are further useful in many metal plating applications. In order to effect metal plating using the compounds, they are decomposed in an evacuated space containing the object to be plated. On decomposition, they lay down a film of metal on the object. The gaseous plating may be carried out in the presence of an inert gas so as to prevent oxidation of the plating metal or the object to be plated during the plating operations.

The gaseous plating technique described above finds wide application in forming coatings which are not only decorative but also protect the underlying substrate material.

Deposition of metal on a glass cloth illustrates the applied process. A glass cloth band weighing one gram is dried for one hour in an oven at 150° C. It is then placed in a tube which is devoid of air and there is added to the tube 0.5 gram of bromoacetylcyclopentadienyl manganese tricarbonyl. The tube is heated at 400° C. for one hour after which time it is cooled and opened. The cloth has a uniform metallic grey appearance and exhibits a gain in weight of about 0.02 gram.

A further utility for our compounds is as drying agents in which case the compounds are incorporated in paints, varnish, printing inks, synthetic resins of the drying oil type, oil enamels and the like. A still further utility for our compounds is their use as chemical intermediates in the preparation of metal-containing polymeric materials or in the preparation of new organic materials.

Having fully defined the novel compounds of our invention, their mode of preparation and their many utilities, we desire to be limited only within the lawful scope of the appended claim.

We claim:

Chlorocarbonylcyclopentadienyl manganese tricarbonyl.

References Cited

Arimato and Haven: J. Am. Chem. Soc. 77, Dec. 5, 1955, page 6296.

Karrer: Organic Chemistry, Elsevier Publishing Co., Inc., New York, N.Y. (1946), page 208.

Kozikowski et al., J. Am. Chem. Soc., 81, June 20, 1959, page 2995.

TOBIAS E. LEVOW, *Primary Examiner.*

HELEN M. McCARTHY, *Examiner.*

T. L. IAPALUCCI, A. P. DEMERS, *Assistant Examiners.*